(12) United States Patent
Pillilli et al.

(10) Patent No.: US 11,494,330 B2
(45) Date of Patent: Nov. 8, 2022

(54) FUSE RECIPE UPDATE MECHANISM

(71) Applicant: Intel Corporation, Santa Clara, CA (US)

(72) Inventors: Bharat Pillilli, El Dorado Hills, CA (US); Saravana Priya Ramanathan, Portland, OR (US); Reshma Lal, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 17/354,163

(22) Filed: Jun. 22, 2021

(65) Prior Publication Data

US 2021/0311904 A1 Oct. 7, 2021

(51) Int. Cl.
*G06F 15/78* (2006.01)
*G11C 17/16* (2006.01)
*G11C 29/00* (2006.01)

(52) U.S. Cl.
CPC .......... *G06F 15/7853* (2013.01); *G11C 17/16* (2013.01); *G11C 29/789* (2013.01); *G06F 2212/202* (2013.01)

(58) Field of Classification Search
CPC ........... G06F 15/7853; G06F 2212/202; G06F 15/7807; G11C 17/16; G11C 29/789; G11C 29/4401; G11C 2029/4402; G11C 17/18; G11C 29/785; Y02D 10/00
USPC ........................................ 365/225.7
See application file for complete search history.

(56) References Cited

U.S. PATENT DOCUMENTS

| 11,183,260 B1 * | 11/2021 | Fujiwara | ............. G11C 29/785 |
| 2010/0169635 A1 * | 7/2010 | Chinnaswamy | ........ G06F 21/57 726/17 |
| 2011/0161672 A1 * | 6/2011 | Martinez | ................. H04L 63/08 713/168 |
| 2022/0197750 A1 * | 6/2022 | Varadarajan | ............ H03M 7/30 |

FOREIGN PATENT DOCUMENTS

CN 112822115 A * 5/2021

* cited by examiner

*Primary Examiner* — Fernando Hidalgo
(74) *Attorney, Agent, or Firm* — Jaffery Watson Mendonsa & Hamilton LLP (57) ABSTRACT

A computer platform is disclosed. The computer platform comprises a non-volatile memory to store fuse override data; and a system on chip (SOC), coupled to the non-volatile memory, including a fuse memory to store fuse data and security micro-controller to receive the fuse override data and perform a fuse override to overwrite the fuse data stored in the fuse memory with the fuse override data.

23 Claims, 6 Drawing Sheets

| Type | Name | Description |
|---|---|---|
| Header | Region_valid | All zeroes - region is valid |
| | Field 1 | |
| | Field 2 | |
| | ..... | |
| Body | Fuse Body | Fuse addresses and data that needs to be overridden |

FUSE RECIPE UPDATE MECHANISM

BACKGROUND OF THE DESCRIPTION

A system on chip (SOC) is an integrated circuit that integrates all components of a computer or other electronic system. These components include a central processing unit (CPU), memory, input/output (IO) ports and secondary storage, which are all included on a single substrate or microchip. The design of a SOC requires various updates to integrated circuit design prior to manufacture.

BRIEF DESCRIPTION OF THE DRAWINGS

So that the manner in which the above recited features of the present embodiment can be understood in detail, a more particular description of the embodiment, briefly summarized above, may be had by reference to embodiments, some of which are illustrated in the appended drawings. It is to be noted, however, that the appended drawings illustrate only typical embodiments of this embodiment and are therefore not to be considered limiting of its scope, for the embodiment may admit to other equally effective embodiments.

DETAILED DESCRIPTION

In the following description, numerous specific details are set forth to provide a more thorough understanding of the present embodiment. However, it will be apparent to one of skill in the art that the present embodiment may be practiced without one or more of these specific details. In other instances, well-known features have not been described in order to avoid obscuring the present embodiment.

In embodiments, a mechanism is provided to facilitate update fuse recipes during SOC development. In such embodiments, fuse override data is read from a non-volatile memory to an SOC during a Power-On process upon a determination that a fuse override is enabled. In such an embodiment, the fuse override data is used to replace data in a fuse memory.

References to "one embodiment", "an embodiment", "example embodiment", "various embodiments", etc., indicate that the embodiment(s) so described may include particular features, structures, or characteristics, but not every embodiment necessarily includes the particular features, structures, or characteristics. Further, some embodiments may have some, all, or none of the features described for other embodiments.

In the following description and claims, the term "coupled" along with its derivatives, may be used. "Coupled" is used to indicate that two or more elements co-operate or interact with each other, but they may or may not have intervening physical or electrical components between them.

As used in the claims, unless otherwise specified, the use of the ordinal adjectives "first", "second", "third", etc., to describe a common element, merely indicate that different instances of like elements are being referred to and are not intended to imply that the elements so described must be in a given sequence, either temporally, spatially, in ranking, or in any other manner.

Figure 1:
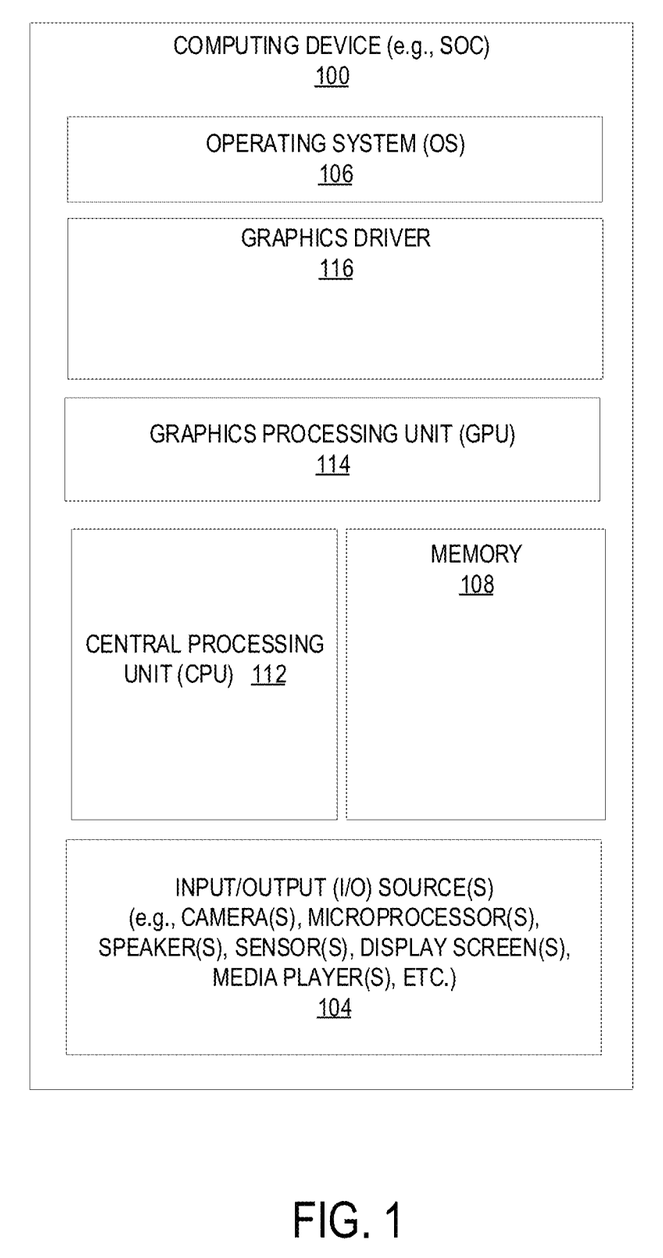
FIG. 1 illustrates one embodiment of a computing device.

FIG. 1 illustrates one embodiment of a computing device 100. According to one embodiment, computing device 100 comprises a computer platform hosting an integrated circuit ("IC"), such as a system on a chip ("SoC" or "SOC"), integrating various hardware and/or software components of computing device 100 on a single chip. As illustrated, in one embodiment, computing device 100 may include any number and type of hardware and/or software components, such as (without limitation) graphics processing unit 114 ("GPU" or simply "graphics processor"), graphics driver 116 (also referred to as "GPU driver", "graphics driver logic", "driver logic", user-mode driver (UMD), UMD, user-mode driver framework (UMDF), UMDF, or simply "driver"), central processing unit 112 ("CPU" or simply "application processor"), memory 108, network devices, drivers, or the like, as well as input/output (I/O) sources 104, such as touchscreens, touch panels, touch pads, virtual or regular keyboards, virtual or regular mice, ports, connectors, etc. Computing device 100 may include operating system (OS) 106 serving as an interface between hardware and/or physical resources of computing device 100 and a user.

It is to be appreciated that a lesser or more equipped system than the example described above may be preferred for certain implementations. Therefore, the configuration of computing device 100 may vary from implementation to implementation depending upon numerous factors, such as price constraints, performance requirements, technological improvements, or other circumstances.

Embodiments may be implemented as any or a combination of: one or more microchips or integrated circuits interconnected using a parentboard, hardwired logic, software stored by a memory device and executed by a microprocessor, firmware, an application specific integrated circuit (ASIC), and/or a field programmable gate array (FPGA). The terms "logic", "module", "component", "engine", and "mechanism" may include, by way of example, software or hardware and/or a combination thereof, such as firmware.

Embodiments may be implemented using one or more memory chips, controllers, CPUs (Central Processing Unit), microchips or integrated circuits interconnected using a motherboard, an application specific integrated circuit (ASIC), and/or a field programmable gate array (FPGA). The term "logic" may include, by way of example, software or hardware and/or combinations of software and hardware.

Figure 2:
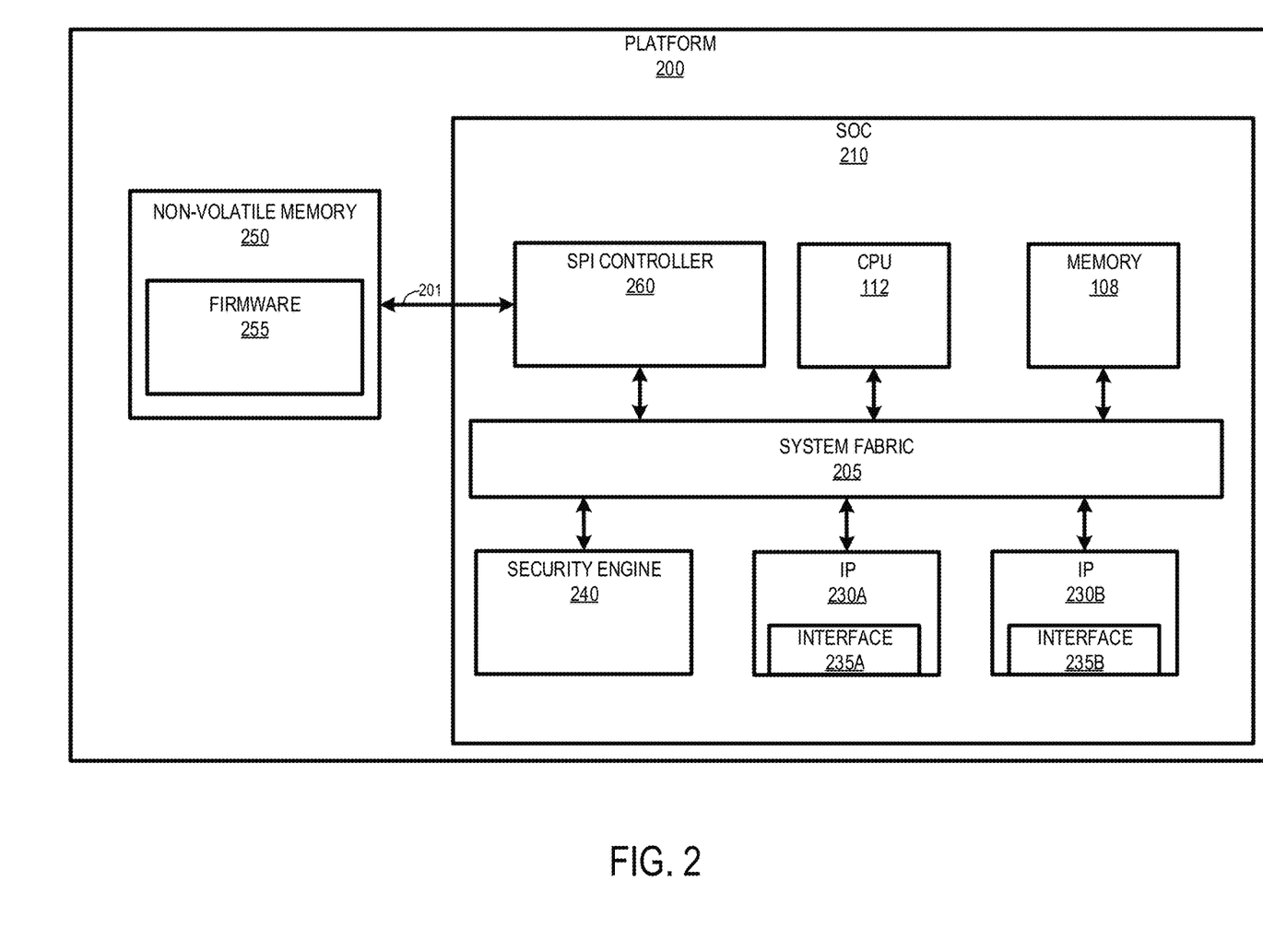
FIG. 2 illustrates one embodiment of a platform.

FIG. 2 illustrates one embodiment of a platform 200 including a SOC 210 similar to computing device 100 discussed above. As shown in FIG. 2, SOC 210 includes other computing device components (e.g., memory 108 and CPU 112) coupled via a system fabric 205. In one embodiment, system fabric 205 comprises an integrated on-chip system fabric (IOSF) to provide a standardized on-die interconnect protocol for coupling interconnect protocol (IP) agents 230 (e.g., IP agents 230A and 230B) within SOC 210. In such an embodiment, the interconnect protocol provides a standardized interface to enable third parties to design logic such as IP agents to be incorporated in SOC 210.

According to embodiment, IP agents 230 may include general purpose processors (e.g., in-order or out-of-order cores), fixed function units, graphics processors, I/O controllers, display controllers, etc. In such an embodiment, each IP agent 230 includes a hardware interface 235 (e.g., 235A and 235B) to provide standardization to enable the IP agent 230 to communicate with SOC 210 components. For example, in an embodiment in which IP agent 230 is a third-party visual processing unit (VPU), interface 235 provides a standardization to enable the VPU to access memory 108 via fabric 205.

Further, SOC 210 is coupled to a non-volatile memory 250. Non-volatile memory 250 may be implemented as a Peripheral Component Interconnect Express (PCIe) storage drive, such as a solid-state drive (SSD) or Non-Volatile Memory Express (NVMe) drives. In one embodiment, non-volatile memory 250 is implemented to store the platform 200 firmware 255. In one embodiment, SOC 210 is coupled to non-volatile memory 250 via a serial peripheral interface (SPI) 201. In such an embodiment, SOC 210 includes SPI controller 260 coupled between SPI 201 and system fabric 205. In a further embodiment, SPI controller 260 is a flash controller implemented to control access to non-volatile memory 250 via SPI 201.

SOC 210 also includes a security engine 240 that performs various security operations (e.g., security processing, cryptographic functions, etc.) for SOC 210. In one embodiment, security engine 240 comprises an IP agent 230 that is implemented to perform the security operations.

During a design phase of a SOC, validation is performed in which recipes for field programmable fuses (or fuse recipes) are designed. Field programmable fuses (FPFs) are integrated within SOC as auxiliary storage for limited quantities of data used to control various security aspects of the SOC. For example, FPFs may be implemented to store configuration information for IP agents 230. As used herein, a fuse recipe comprises a fuse configuration for an integrated circuit.

Fuse recipes involve an iterative validation process resulting in a final version. During an initial phase of SOC silicon prePower-On with unfused parts, a bootscript is used to override fuses. Based on the outcome of the prePower-On phase, a fuse recipe is finalized and provided to a manufacturing team. The manufacturing team subsequently produces fused SOC parts with the fuse recipe to start SOC silicon Power-On. However, a problem with the current process is the dependency on the manufacturing team to manufacture parts with each fuse recipe update, which causes delays (e.g., volume validation delays and delay in samples to customers).

Figure 3:
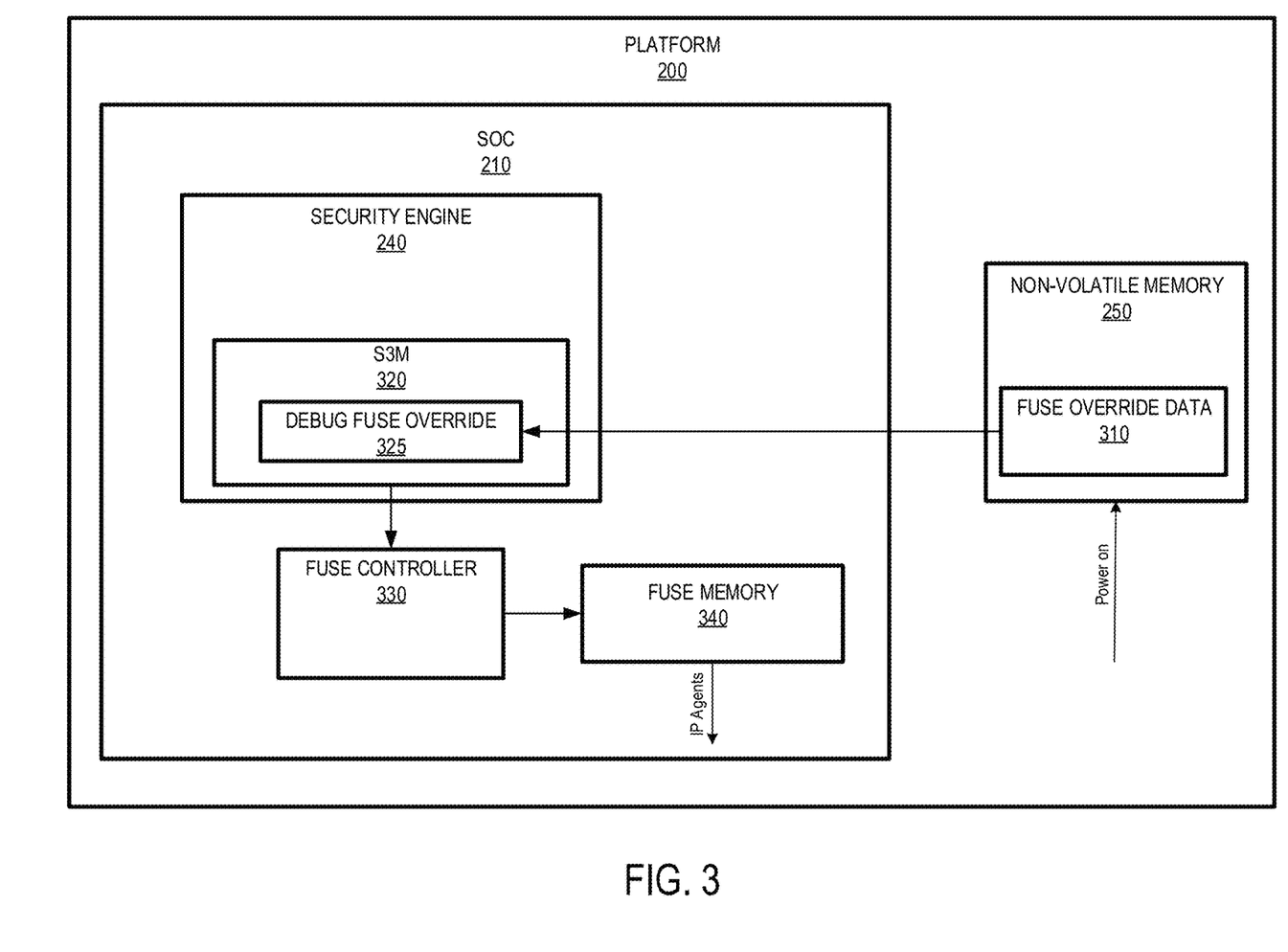
FIG. 3 illustrates another embodiment of a platform.
Figure 4:
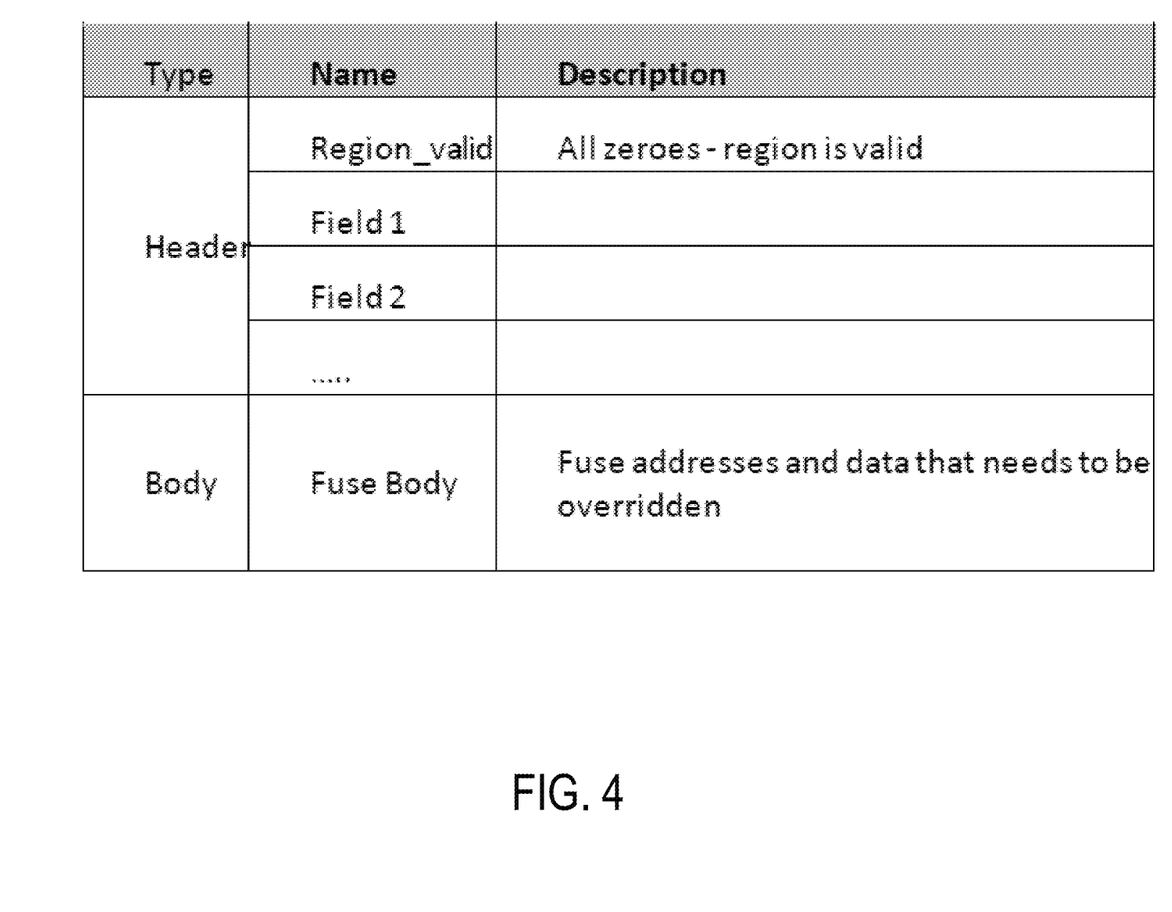
FIG. 4 illustrates one embodiment of a format of fuse data structures.

In one embodiment, a process to update fuse recipes is provided. In such an embodiment, startup code reads a programmable fuse during the Power-On process and overrides data stored in a fuse memory. FIG. 3 illustrates another embodiment of a platform 200. As shown in FIG. 3, fuse override data 310 is stored within non-volatile memory 250. In one embodiment, fuse override data 310 includes a fuse update data structure that is used to override and validate a silicon boot in order to develop the final fuse recipe. FIG. 4 illustrates one embodiment of format of fuse data structures, which includes a header section and body section indicating fuse addresses and data that is to be overridden. In a further embodiment, the fuse override data 310 is programmed into non-volatile memory 250 (e.g., via a flash programmer or out of band), and is used during a platform 200 PowerOn.

According to one embodiment, the fuse override data 310 is accessed by a secure startup services module (S3M) 320. In this embodiment, S3M 320 includes debug fuse override logic 325 to overwrite fuse values stored in fuse memory 340. S3M 320 may comprise firmware within security engine 240 that is implemented to perform security services and secure boot support for platform 200. In a further embodiment, S3M 320 is configured to access fuse memory 340 via a fuse controller 330. In such an embodiment, fuse memory 340 includes fuse data that is used to program IP agents 230. IP agents 230 may access data stored in fuse memory 340 via a request to fuse controller 330.

In one embodiment, S3M 320 is implemented to perform a fuse override upon boot of platform 200 whenever debug fuse override logic 325 indicates that fuse override is enabled. In this embodiment, debug fuse override logic 325 comprises one or more hardware fuse bits that are programmed to indicate whenever fuse override is enabled. For example, the hardware fuse bits are programmed with a first value when fuse override is enabled, and a second value fuse override is disabled. In a further embodiment, the fuse bit values are defined to be different from the values programmed by a manufacturing team on production parts, which ensures that this feature will not accidentally be enabled on production parts.

S3M 320 reads fuse override data 310 from within non-volatile memory 250 and overrides the fuse values stored in fuse memory 340 upon determining that fuse override is enable. In one embodiment, S3M 320 overrides the previous fuse values stored in fuse memory 340 by overwriting the values with the fuse override data via fuse controller 330. In a further embodiment, IP agents 230 come out of reset and retrieves the fuse values from fuse memory 340 after the fuse values are updated with the fuse override data by S3M 320.

Figure 5:
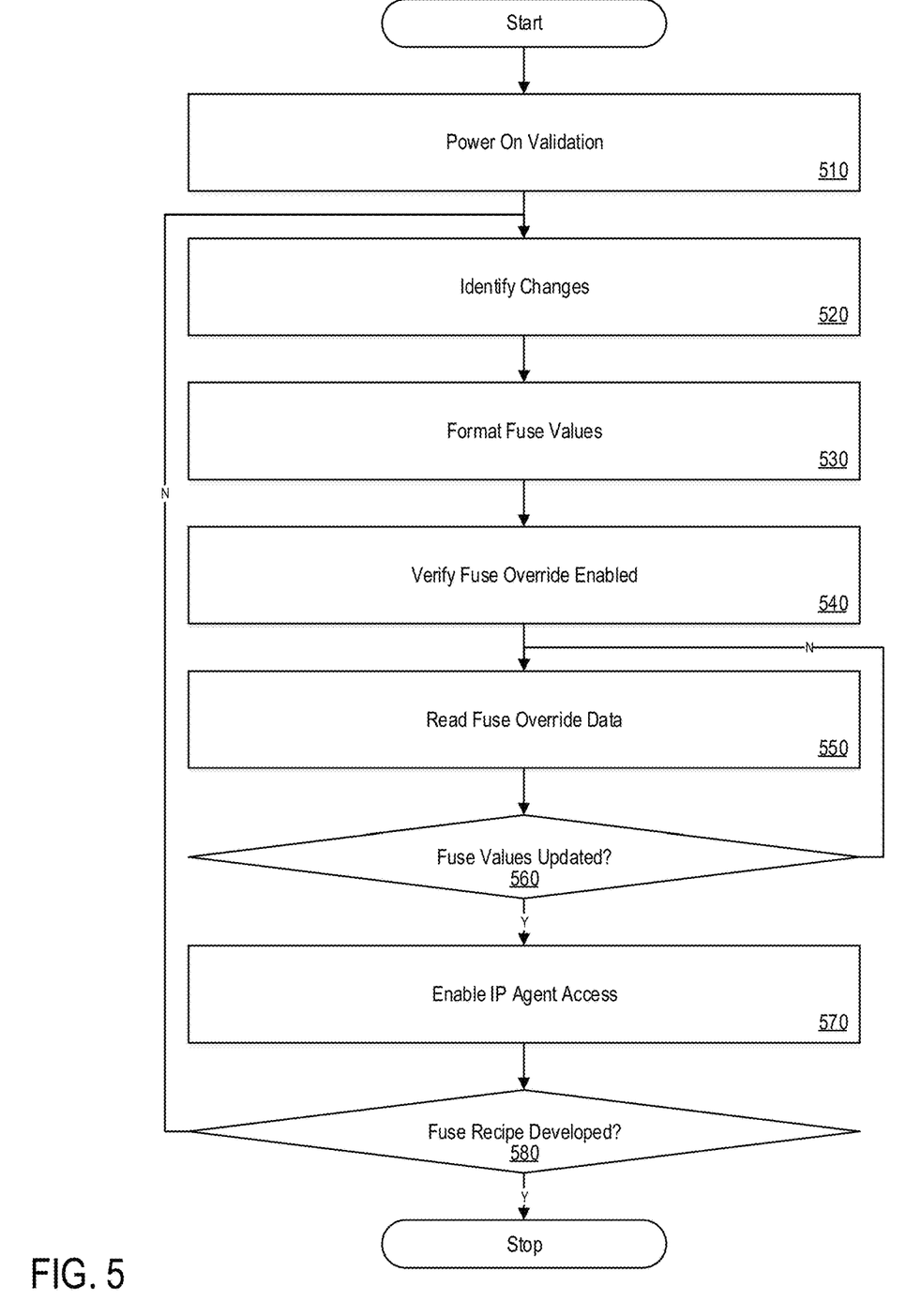
FIG. 5 is a flow diagram illustrating one embodiment of a process for updating fuse recipes.

FIG. 5 is a flow diagram illustrating one embodiment of a process for updating fuse recipes. At processing block 510, platform 200 is powered on during validation (PowerOn validation) occurs. At processing block 520, changes to the fuse recipe are identified. At processing block 530, fuse values that need to be updated are formatted as per the defined data structure (e.g., via debug fuse override logic 325) as shown in FIG. 4). Subsequently, the fuse values are programmed into non-volatile memory 250.

At processing block 540, S3M 320 verifies that fuse override is enabled via upon platform 200 boot. As mentioned above, the verification is performed by examining hardware fuse values within S3M 320. At processing block 550, S3M 320 retrieve fuse override data 310 from non-volatile memory 250 and overwrites the fuse values in fuse memory 340. At decision block 560, a determination is made as to whether the fuse values have been updated. If not, control is returned to processing block 550, where S3M 320 continues to read fuse override data 310 from non-volatile memory 250. Otherwise, IP agents 230 come out of reset and retrieve fuse values from fuse memory 340, processing block 570.

At decision block 580, a determination is made as to whether the fuse recipe has been developed. If not, control is returned to processing block 520, where new changes to the fuse recipe are identified. Otherwise, the process has been completed, and the SOC 200 is provided to the manufacturing team to manufacture production parts. The above-described mechanism simplifies the process of refining a fuse recipe and removes the reliance on a manufacturing team for programming fuses.

Figure 6:
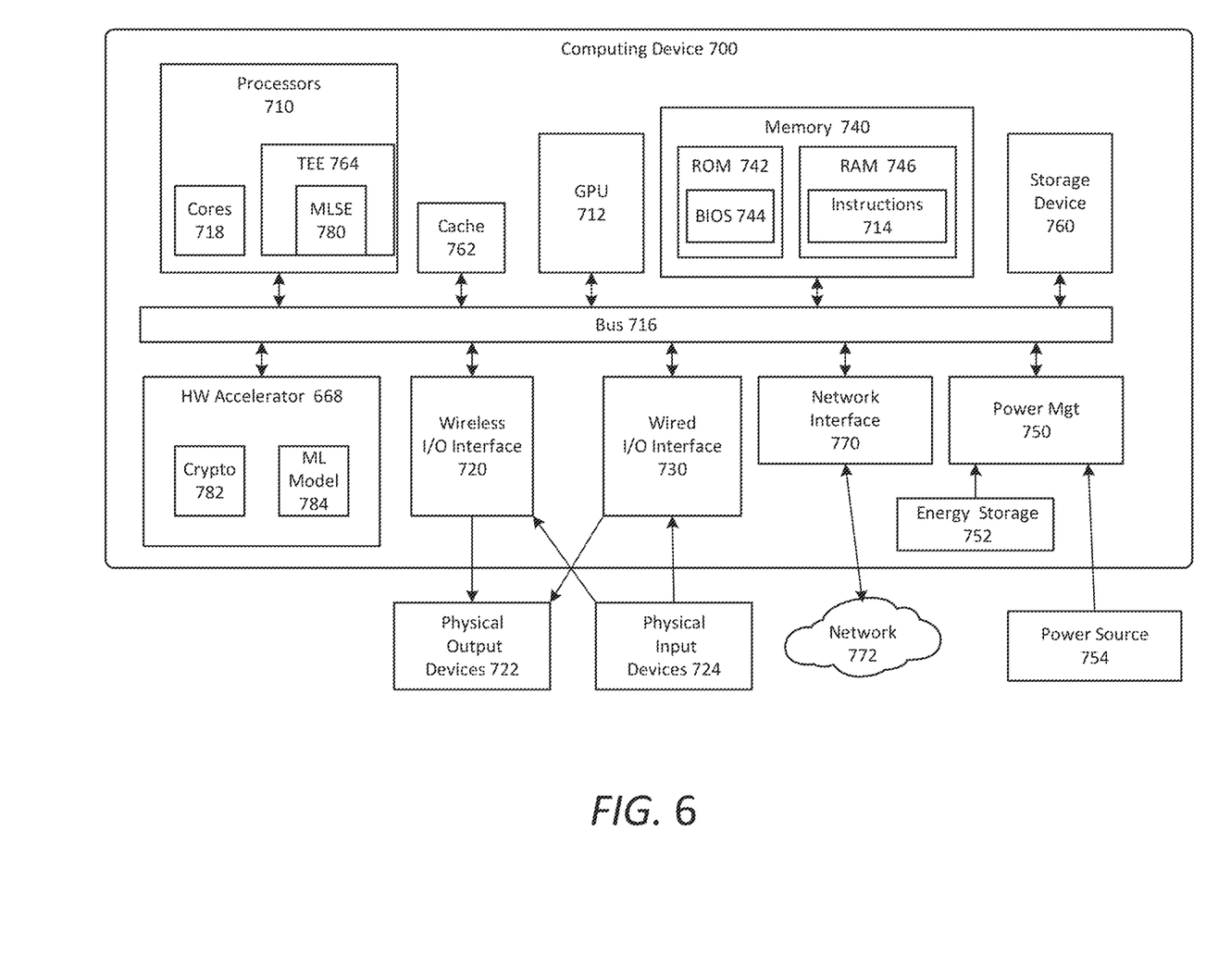
FIG. 6 illustrates one embodiment of a schematic diagram of an illustrative electronic computing device.

FIG. 6 is a schematic diagram of an illustrative electronic computing device to enable enhanced protection against adversarial attacks according to some embodiments. In some embodiments, the computing device 700 includes one or more processors 710 including one or more processors cores 718 and a TEE 764, the TEE including a machine learning service enclave (MLSE) 780. In some embodiments, the computing device 700 includes a hardware accelerator 768, the hardware accelerator including a cryptographic engine 782 and a machine learning model 784. In some embodiments, the computing device is to provide enhanced protections against ML adversarial attacks, as provided in FIGS. 1-5.

The computing device 700 may additionally include one or more of the following: cache 762, a graphical processing unit (GPU) 712 (which may be the hardware accelerator in some implementations), a wireless input/output (I/O) interface 720, a wired I/O interface 730, memory circuitry 740, power management circuitry 750, non-transitory storage device 760, and a network interface 770 for connection to a network 772. The following discussion provides a brief, general description of the components forming the illustrative computing device 700. Example, non-limiting computing devices 700 may include a desktop computing device, blade server device, workstation, or similar device or system.

In embodiments, the processor cores 718 are capable of executing machine-readable instruction sets 714, reading data and/or instruction sets 714 from one or more storage devices 760 and writing data to the one or more storage devices 760. Those skilled in the relevant art will appreciate that the illustrated embodiments as well as other embodiments may be practiced with other processor-based device configurations, including portable electronic or handheld electronic devices, for instance smartphones, portable computers, wearable computers, consumer electronics, personal computers ("PCs"), network PCs, minicomputers, server blades, mainframe computers, and the like.

The processor cores 718 may include any number of hardwired or configurable circuits, some or all of which may include programmable and/or configurable combinations of electronic components, semiconductor devices, and/or logic elements that are disposed partially or wholly in a PC, server, or other computing system capable of executing processor-readable instructions.

The computing device 700 includes a bus or similar communications link 716 that communicably couples and facilitates the exchange of information and/or data between various system components including the processor cores 718, the cache 762, the graphics processor circuitry 712, one or more wireless I/O interfaces 720, one or more wired I/O interfaces 730, one or more storage devices 760, and/or one or more network interfaces 770. The computing device 700 may be referred to in the singular herein, but this is not intended to limit the embodiments to a single computing device 700, since in certain embodiments, there may be more than one computing device 700 that incorporates, includes, or contains any number of communicably coupled, collocated, or remote networked circuits or devices.

The processor cores 718 may include any number, type, or combination of currently available or future developed devices capable of executing machine-readable instruction sets.

The processor cores 718 may include (or be coupled to) but are not limited to any current or future developed single- or multi-core processor or microprocessor, such as: on or more systems on a chip (SOCs); central processing units (CPUs); digital signal processors (DSPs); graphics processing units (GPUs); application-specific integrated circuits (ASICs), programmable logic units, field programmable gate arrays (FPGAs), and the like. Unless described otherwise, the construction and operation of the various blocks shown in FIG. 6 are of conventional design. Consequently, such blocks need not be described in further detail herein, as they will be understood by those skilled in the relevant art. The bus 716 that interconnects at least some of the components of the computing device 700 may employ any currently available or future developed serial or parallel bus structures or architectures.

The system memory 740 may include read-only memory ("ROM") 742 and random-access memory ("RAM") 746. A portion of the ROM 742 may be used to store or otherwise retain a basic input/output system ("BIOS") 744. The BIOS 744 provides basic functionality to the computing device 700, for example by causing the processor cores 718 to load and/or execute one or more machine-readable instruction sets 714. In embodiments, at least some of the one or more machine-readable instruction sets 714 cause at least a portion of the processor cores 718 to provide, create, produce, transition, and/or function as a dedicated, specific, and particular machine, for example a word processing machine, a digital image acquisition machine, a media playing machine, a gaming system, a communications device, a smartphone, or similar.

The computing device 700 may include at least one wireless input/output (I/O) interface 720. The at least one wireless I/O interface 720 may be communicably coupled to one or more physical output devices 722 (tactile devices, video displays, audio output devices, hardcopy output devices, etc.). The at least one wireless I/O interface 720 may communicably couple to one or more physical input devices 724 (pointing devices, touchscreens, keyboards, tactile devices, etc.). The at least one wireless I/O interface 720 may include any currently available or future developed wireless I/O interface. Example wireless I/O interfaces include, but are not limited to: BLUETOOTH®, near field communication (NFC), and similar.

The computing device 700 may include one or more wired input/output (I/O) interfaces 730. The at least one wired I/O interface 730 may be communicably coupled to one or more physical output devices 722 (tactile devices, video displays, audio output devices, hardcopy output devices, etc.). The at least one wired I/O interface 730 may be communicably coupled to one or more physical input devices 724 (pointing devices, touchscreens, keyboards, tactile devices, etc.). The wired I/O interface 730 may include any currently available or future developed I/O interface. Example wired I/O interfaces include but are not limited to: universal serial bus (USB), IEEE 1394 ("FireWire"), and similar.

The computing device 700 may include one or more communicably coupled, non-transitory, data storage devices 760. The data storage devices 760 may include one or more hard disk drives (HDDs) and/or one or more solid-state storage devices (SSDs). The one or more data storage devices 760 may include any current or future developed storage appliances, network storage devices, and/or systems. Non-limiting examples of such data storage devices 760 may include, but are not limited to, any current or future developed non-transitory storage appliances or devices, such as one or more magnetic storage devices, one or more optical storage devices, one or more electro-resistive storage devices, one or more molecular storage devices, one or more quantum storage devices, or various combinations thereof. In some implementations, the one or more data storage devices 760 may include one or more removable storage devices, such as one or more flash drives, flash memories, flash storage units, or similar appliances or devices capable of communicable coupling to and decoupling from the computing device 700.

The one or more data storage devices 760 may include interfaces or controllers (not shown) communicatively coupling the respective storage device or system to the bus 716.

The one or more data storage devices 760 may store, retain, or otherwise contain machine-readable instruction sets, data structures, program modules, data stores, databases, logical structures, and/or other data useful to the processor cores 718 and/or graphics processor circuitry 712 and/or one or more applications executed on or by the processor cores 718 and/or graphics processor circuitry 712. In some instances, one or more data storage devices 760 may be communicably coupled to the processor cores 718, for example via the bus 716 or via one or more wired communications interfaces 730 (e.g., Universal Serial Bus or USB); one or more wireless communications interfaces 720 (e.g., Bluetooth®, Near Field Communication or NFC); and/or one or more network interfaces 770 (IEEE 802.3 or Ethernet, IEEE 802.11, or Wi-Fi®, etc.).

Processor-readable instruction sets 714 and other programs, applications, logic sets, and/or modules may be stored in whole or in part in the system memory 740. Such instruction sets 714 may be transferred, in whole or in part, from the one or more data storage devices 760. The instruction sets 714 may be loaded, stored, or otherwise retained in system memory 740, in whole or in part, during execution by the processor cores 718 and/or graphics processor circuitry 712.

The computing device 700 may include power management circuitry 750 that controls one or more operational aspects of the energy storage device 752. In embodiments, the energy storage device 752 may include one or more primary (i.e., non-rechargeable) or secondary (i.e., rechargeable) batteries or similar energy storage devices. In embodiments, the energy storage device 752 may include one or more supercapacitors or ultracapacitors. In embodiments, the power management circuitry 750 may alter, adjust, or control the flow of energy from an external power source 754 to the energy storage device 752 and/or to the computing device 700. The power source 754 may include, but is not limited to, a solar power system, a commercial electric grid, a portable generator, an external energy storage device, or any combination thereof.

For convenience, the processor cores 718, the graphics processor circuitry 712, the wireless I/O interface 720, the wired I/O interface 730, the storage device 760, and the network interface 770 are illustrated as communicatively coupled to each other via the bus 716, thereby providing connectivity between the above-described components. In alternative embodiments, the above-described components may be communicatively coupled in a different manner than illustrated in FIG. 6. For example, one or more of the above-described components may be directly coupled to other components, or may be coupled to each other, via one or more intermediary components (not shown). In another example, one or more of the above-described components may be integrated into the processor cores 718 and/or the graphics processor circuitry 712. In some embodiments, all or a portion of the bus 716 may be omitted and the components are coupled directly to each other using suitable wired or wireless connections.

Embodiments may be provided, for example, as a computer program product which may include one or more transitory or non-transitory machine-readable storage media having stored thereon machine-executable instructions that, when executed by one or more machines such as a computer, network of computers, or other electronic devices, may result in the one or more machines carrying out operations in accordance with embodiments described herein. A machine-readable medium may include, but is not limited to, floppy diskettes, optical disks, CD-ROMs (Compact Disc-Read Only Memories), and magneto-optical disks, ROMs, RAMs, EPROMs (Erasable Programmable Read Only Memories), EEPROMs (Electrically Erasable Programmable Read Only Memories), magnetic or optical cards, flash memory, or other type of media/machine-readable medium suitable for storing machine-executable instructions.

Some embodiments pertain to Example 1 that includes a computer platform comprising a non-volatile memory to store fuse override data and a system on chip (SOC), coupled to the non-volatile memory including a fuse memory to store fuse data and security micro-controller to receive the fuse override data and perform a fuse override to overwrite the fuse data stored in the fuse memory with the fuse override data.

Example 2 includes the subject matter of Example 1, wherein security micro-controller comprises debug fuse override hardware to indicate when fuse override is enabled.

Example 3 includes the subject matter of Examples 1 and 2, wherein debug fuse override hardware comprises one or more hardware fuse bits.

Example 4 includes the subject matter of Examples 1-3, wherein the SOC further comprises one or more interconnect protocol (IP) agents to retrieve the fuse override data from the fuse memory.

Example 5 includes the subject matter of Examples 1-4, wherein the SOC further comprises a fuse controller to control access of the fuse memory to the one or more IP agents.

Example 6 includes the subject matter of Examples 1-5, wherein the fuse override data comprises a fuse update data structure.

Example 7 includes the subject matter of Examples 1-6, wherein the fuse update data structure comprises header section and a body section.

Example 8 includes the subject matter of Examples 1-7, wherein the body section indicates fuse addresses and data that is to be overridden.

Example 9 includes the subject matter of Examples 1-8, wherein fuse override is performed during a validation power on of the computer platform.

Some embodiments pertain to Example 10 that includes a method comprising verifying that a fuse override is enabled at a system on chip (SOC), retrieve fuse override data from a non-volatile memory and perform a fuse override at the SOC, including overwriting fuse data stored in a fuse memory with the fuse override data.

Example 11 includes the subject matter of Example 10, wherein the verification is performed by examining a value of one or more hardware fuses.

Example 12 includes the subject matter of Examples 10 and 11, further comprising one or more interconnect protocol (IP) agents retrieving the fuse override data from the fuse memory.

Example 13 includes the subject matter of Examples 10-12, further comprising identifying changes to a fuse recipe.

Example 14 includes the subject matter of Examples 10-13, further comprising programming fuse values associated with the changes to the fuse recipe into the non-volatile memory.

Some embodiments pertain to Example 15 that includes a system on chip (SOC) comprising a fuse memory to store fuse data and security micro-controller to receive the fuse override data from a non-volatile memory and perform a fuse override to overwrite the fuse data stored in the fuse memory with the fuse override data.

Example 16 includes the subject matter of Example 15, wherein security micro-controller comprises debug fuse override hardware to indicate when fuse override is enabled.

Example 17 includes the subject matter of Examples 15 and 16, further comprising one or more interconnect protocol (IP) agents to retrieve the fuse override data from the fuse memory.

Example 18 includes the subject matter of Examples 15-17, further comprising a fuse controller to control access of the fuse memory to the one or more IP agents.

Example 19 includes the subject matter of Examples 15-18, wherein the fuse override data comprises a fuse update data structure.

Example 20 includes the subject matter of Examples 15-19, wherein the fuse update data structure comprises header section and a body section.

Some embodiments pertain to Example 21 that includes at least one computer readable medium having instructions stored thereon, which when executed by one or more processors, cause the processors to verify that a fuse override is enabled at a system on chip (SOC), retrieve fuse override data from a non-volatile memory and perform a fuse override at the SOC, including overwriting fuse data stored in a fuse memory with the fuse override data.

Example 22 includes the subject matter of Example 21, wherein the verification is performed by examining a value of one or more hardware fuses.

Example 23 includes the subject matter of Examples 21 and 22, having instructions stored thereon, which when executed by one or more processors, further cause one or more interconnect protocol (IP) agents to retrieve the fuse override data from the fuse memory.

Example 24 includes the subject matter of Examples 21-23, having instructions stored thereon, which when executed by one or more processors, further cause the processors to identify changes to a fuse recipe.

Example 25 includes the subject matter of Examples 21-24, having instructions stored thereon, which when executed by one or more processors, further cause the processors to program fuse values associated with the changes to the fuse recipe into the non-volatile memory.

The embodiment has been described above with reference to specific embodiments. Persons skilled in the art, however, will understand that various modifications and changes may be made thereto without departing from the broader spirit and scope of the embodiment as set forth in the appended claims. The foregoing description and drawings are, accordingly, to be regarded in an illustrative rather than a restrictive sense.

What is claimed is:

1. A computing device comprising:
   a non-volatile memory to store fuse override data; and
   a system on chip (SOC), coupled to the non-volatile memory, including:
   a fuse memory to store fuse data; and
   security micro-controller to receive the fuse override data and perform a fuse override to overwrite the fuse data stored in the fuse memory with the fuse override data, including debug fuse override hardware to indicate when fuse override is enabled.

2. The computer device of claim 1, wherein the debug fuse override hardware comprises one or more hardware fuse bits.

3. The computer device of claim 2, wherein the SOC further comprises one or more interconnect protocol (IP) agents to retrieve the fuse override data from the fuse memory.

4. The computer device of claim 3, wherein the SOC further comprises a fuse controller to control access of the fuse memory to the one or more IP agents.

5. The computer device of claim 1, wherein the fuse override data comprises a fuse update data structure.

6. The computer device of claim 5, wherein the fuse update data structure comprises a header section and a body section.

7. The computer device of claim 6, wherein the body section indicates fuse addresses and data that is to be overridden.

8. The computer device of claim 1, wherein the fuse override is performed during a validation power on of the computer platform.

9. A method comprising:
   verifying that a fuse override is enabled at a system on chip (SOC);
   retrieving fuse override data from a non-volatile memory; and
   performing a fuse override at the SOC, including overwriting fuse data stored in a fuse memory with the fuse override data.

10. The method of claim 9, wherein verification is performed by examining a value of one or more hardware fuses.

11. The method of claim 10, further comprising one or more interconnect protocol (IP) agents retrieving the fuse override data from the fuse memory.

12. The method of claim 9, further comprising identifying changes to a fuse recipe.

13. The method of claim 12, further comprising programming fuse values associated with the changes to the fuse recipe into the non-volatile memory.

14. A system on chip (SOC) comprising:
    a fuse memory to store fuse data; and
    security micro-controller to receive fuse override data from a non-volatile memory and perform a fuse override to overwrite the fuse data stored in the fuse memory with the fuse override data, including debug fuse override hardware to indicate when fuse override is enabled.

15. The SOC of claim 14, further comprising one or more interconnect protocol (IP) agents to retrieve the fuse override data from the fuse memory.

16. The SOC of claim 15, further comprising a fuse controller to control access of the fuse memory to the one or more IP agents.

17. The SOC of claim 14, wherein the fuse override data comprises a fuse update data structure.

18. The SOC of claim 17, wherein the fuse update data structure comprises a header section and a body section.

19. At least one computer readable medium having instructions stored thereon, which when executed by one or more processors, cause the processors to:
    verify that a fuse override is enabled at a system on chip (SOC);
    retrieve fuse override data from a non-volatile memory; and
    perform a fuse override at the SOC, including overwriting fuse data stored in a fuse memory with the fuse override data.

20. The computer readable medium of claim 19, wherein verification is performed by examining a value of one or more hardware fuses.

21. The computer readable medium of claim 20, having instructions stored thereon, which when executed by one or more processors, further cause one or more interconnect protocol (IP) agents to retrieve the fuse override data from the fuse memory.

22. The computer readable medium of claim 19, having instructions stored thereon, which when executed by one or more processors, further cause the processors to identify changes to a fuse recipe.

23. The computer readable medium of claim 22, having instructions stored thereon, which when executed by one or more processors, further cause the processors to program fuse values associated with the changes to the fuse recipe into the non-volatile memory.

\* \* \* \* \*